United States Patent [19]

Kokoszka et al.

[11] Patent Number: 4,605,315

[45] Date of Patent: Aug. 12, 1986

[54] TEMPERATURE PROBE FOR ROTATING MACHINERY

[75] Inventors: Joseph M. Kokoszka, Enfield; Rocco M. Tommasini, West Hartford, both of Conn.

[73] Assignee: United Technologies Corporation, Hartford, Conn.

[21] Appl. No.: 681,395

[22] Filed: Dec. 13, 1984

[51] Int. Cl.$^4$ .................... G01K 1/14; G01K 13/02
[52] U.S. Cl. .................... 374/144; 374/138
[58] Field of Search ............ 374/144, 138, 148, 153; 73/861.55, 861.56

[56] References Cited

U.S. PATENT DOCUMENTS

| | | | |
|---|---|---|---|
| 3,000,213 | 9/1961 | Eves et al. | 374/138 |
| 3,605,495 | 9/1971 | Krause et al. | 374/138 |
| 4,244,222 | 1/1981 | Hoyer et al. | 73/861.65 |
| 4,433,584 | 2/1984 | Kokoszka et al. | 73/861.66 |
| 4,448,069 | 5/1984 | Gibert | 73/861.65 X |

FOREIGN PATENT DOCUMENTS 0814758 6/1959 United Kingdom ............ 73/861.65

Primary Examiner—Daniel M. Yasich
Attorney, Agent, or Firm—Norman Friedland

[57] ABSTRACT

The inlet for a temperature measuring probe mounted in the leading edge of a strut or vane is constructed to project beyond the leading edge into the flow stream being measured and having the end scarfed in the direction of the flow stream. This measuring probe has particular utility where the flow direction changes as in gas turbine power plant.

3 Claims, 6 Drawing Figures

FIG. 1 *PRIOR ART*

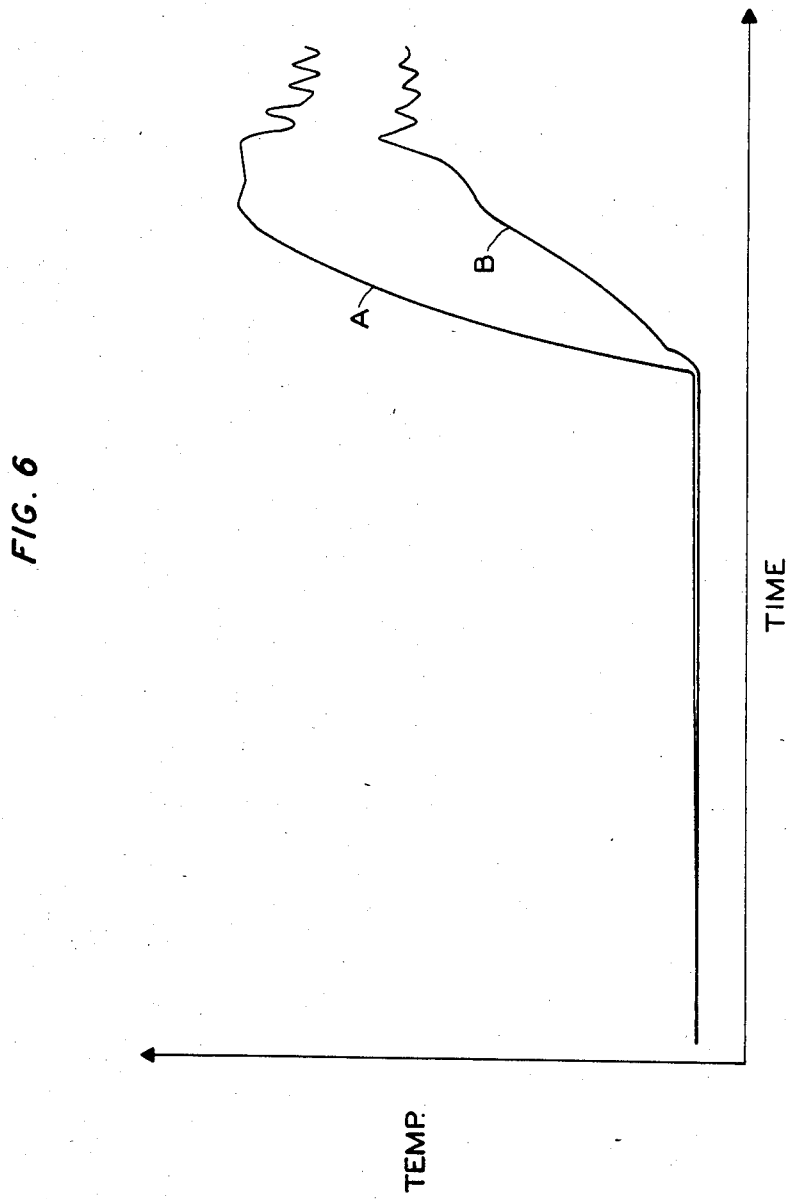

TEMPERATURE PROBE FOR ROTATING MACHINERY

DESCRIPTION

1. Technical Field

This invention relates to temperature probes and particularly to the type of temperature probes utilized on gas tubine engines.

2. Background Art

Historically, temperature measuring devices utilized on gas turbine engines must be able to give accurate readings over a wide range of engine operating conditions. It has been customary to install the temperature probe in the gas path at some location where the direction of the air remains relatively constant. For example, the JT9D engine manufactured by Pratt & Whitney Aircraft of United Technologies Corporation, the assignee of this patent application, has its temperature probes in an aerodynamically-shaped housing installed in the gaseous stream adjacent the downstream end of the struts in the exhaust case. A prior art construction is illustrated in FIG. 1 where the probe 10 comprises a housing 11 having an inlet 12 facing the airstream, a temperature measuring element 14 suitably mounted in the housing, and an outlet 16 on the downstream end. Obviously, since the pressure is slightly higher at the inlet than at the outlet, the gaseous medium freely flows through the housing, comes into contact with the temperature measuring element, giving satisfactory indication of temperature. The position of probe 10 relative to the strut 18 is extremely important and is chosen because the direction of the engine's working fluid medium discharging from the turbine buckets 20 is relatively constant and oriented relative to inlet 12 of probe 10 due to the flow alignment of strut 18.

However, as noted from the installation in FIG. 1, the probe being in the airstream, creates a pressure drop and hence represents a loss in pressure to the engine's working medium, which, obviously, results in a penalty to engine operating performance. In the interest of eliminating such a penalty, attempts have been made to install the temperature probes in the strut itself, as was done with the pressure probe described in our U.S. Pat. No. 4,433,584 issued to us on Feb. 28, 1984 entitled TOTAL PRESSURE PROBE and assigned to the same assignee as this patent application. The inlet to the probe described in the U.S. Pat. No. 4,433,584, supra would obviously not be satisfactory because the inlet and outlet are designed for a given design at an operating condition to produce a satisfactory indication of total pressure. This installation inherently prevents the inlet from producing a velocity at the low pressure conditions, which is the environment when the engine is operating below idle and hence the temperature measuring element would not respond to the actual temperature conditions.

An inlet configured similar to the embodiment in FIG. 5 and another with a tube extending from the leading edge was constructed and tested and as is apparent from the graph in FIG. 6, curve labeled B, neither installation produced satisfactory results. While the temperature sensor of these installations were satisfactory for engine operating conditions above idle, they were deficient for conditions below idle. In an aircraft engine environment, the necessity of measuring temperature accurately in all conditions is vital and particularly in the below idle condition inasmuch as it is necessary to ascertain a "hot start" condition. A "hot start" condition is where ignition of the engine is initiated and the engine doesn't start. The burning of fuel in this condition causes an intolerable temperature rise that must be aborted before exceeding the integrity of the engine component parts. Hence, the temperature sensor monitors this condition and relays a signal when either the temperature exceeds a predetermined limit or the rate of temperature change is at an undesirable value. This condition is exemplified in the graph depicted in FIG. 6 where the curve labeled A represents the signal produced by a probe encorporating the invention and curve B represents a signal produced by a probe that includes an inlet similar to the one described in U.S. Pat. No. 4,433,584 supra. The tests represented by this graph were done concurrently so that conditions for both probes were identical. As is apparent, the rate of change for the sensor producing curve B was too slow to be of any value, as a "hot start" would occur before corrective action could be manifested.

DISCLOSURE OF INVENTION

A feature of this invention is to provide a temperture probe that obviates the problems noted above. In particular, the probe of this invention is installed in a strut or vane and is designed to provide a fixed stagnation point at the throat of the probe's inlet which provides satisfactory indication of temperature throughout the entire operating envelope of the engine. A feature of the invention is to provide a tube projecting beyond the leading edge of a vane or strut which is scarfed in the direction of the flow of the engine's working medium. Thus, any change in direction of flow of the engine's working medium will have substantially no effect on the flow of that medium passing through the probe.

Other features and advantages will be apparent from the specification and claims and from the accompanying drawings which illustrate an embodiment of the invention.

BRIEF DESCRIPTION OF DRAWINGS

FIG. 5 is a view similar to the view in FIG. 3 showing the inlet that proved unsatisfactory.

FIG. 6 is a graph illustrating the results of the tests conducted for inlets of the type depicted in FIGS. 3 and 5.

BEST MODE FOR CARRYING OUT THE INVENTION

While this invention is described in its preferred embodiment to being attached to the leading edge of a strut of a gas turbine engine, the invention as will be obvious to one ordinarily skilled in this art has application wherever temperature accuracy is desired and the direction of the fluid stream being sensed varies.

Figure 1:
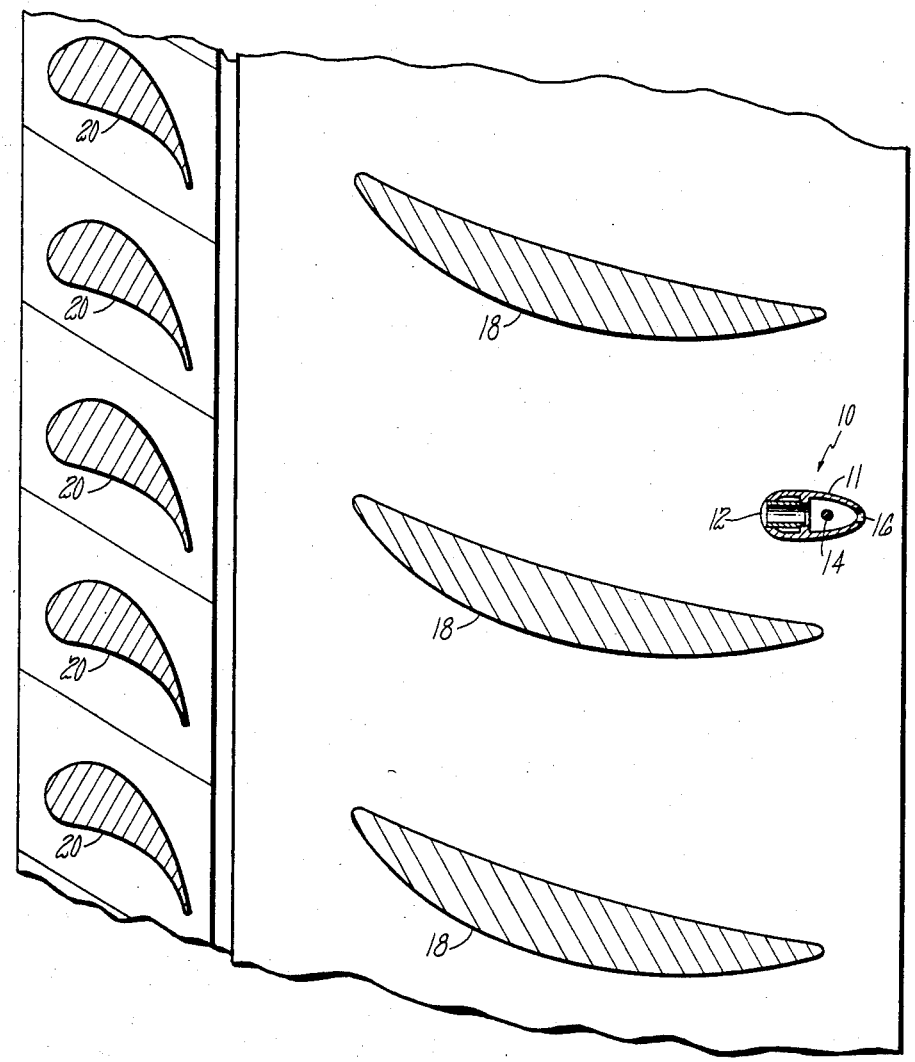
FIG. 1 is a partial projected view in section illustrating the engine exhaust case with the prior art temperature probe.
Figure 2:
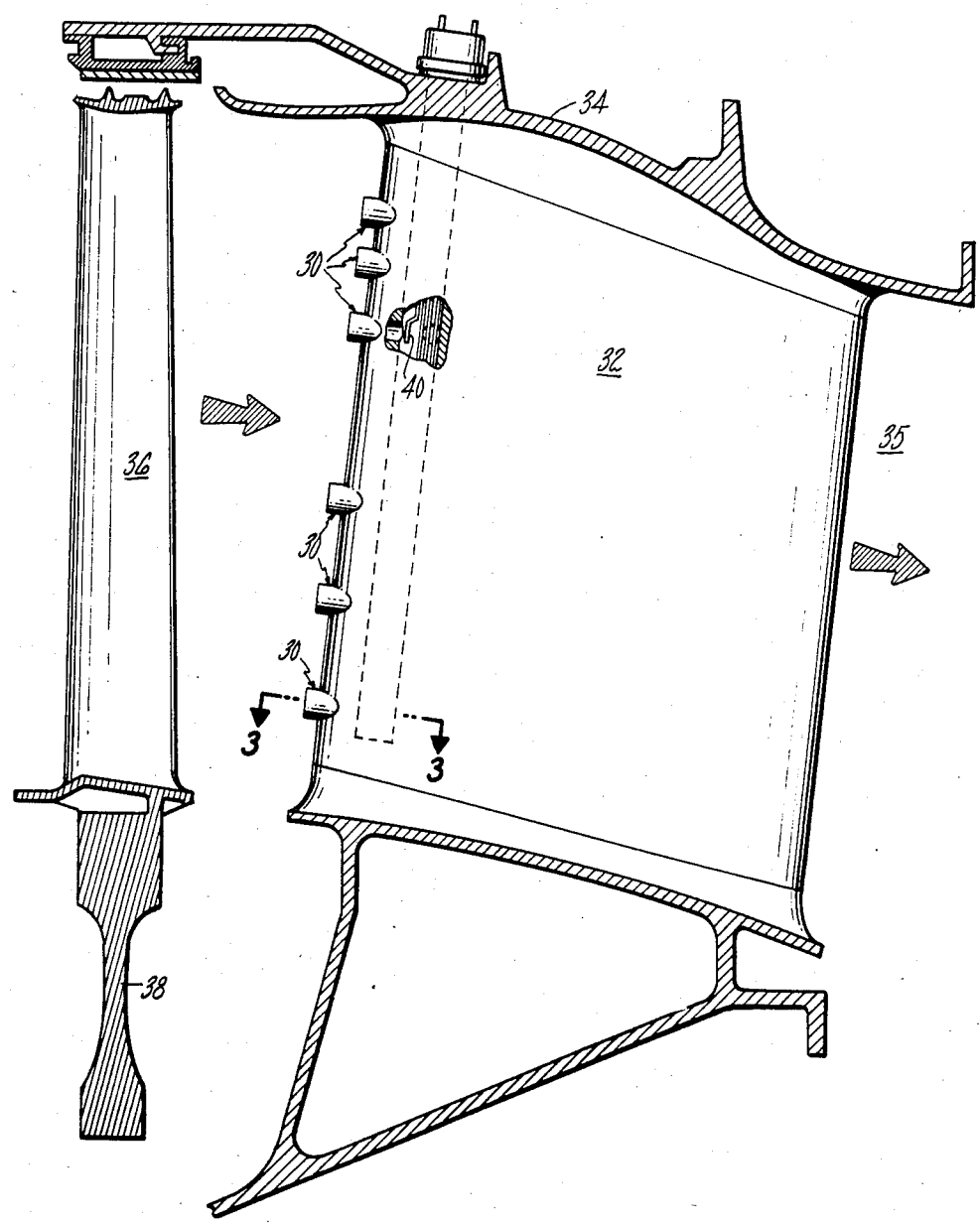
FIG. 2 is a partial view in section illustrating the temperature probe of the invention mounted in the leading edge of the strut of the engine exhaust case.

This invention is currently being utilized on the PW2037 engine manufactured by Pratt & Whitney Aircraft of United Technologies Corporation, supra. FIG. 2 depicting the invention shows a plurality of inlets 30 extending from the leading edge of a strut 32 suitably mounted in the engine's exhaust case 34. The engine exhaust case 34 is generally circular in shape and carries a plurality of such struts circumferentially spaced internally of the case. The exhaust case 34 defines an annular space 35 through which the engines fluid working medium discharging from the turbine rotor 38 flows. The inlet 30 serves to admit the engine's working medium internally of the strut to pass over the temperature measuring element 40 which may be of any commercially available suitable design that is capable of operating and sensing temperature in this environment.

Figure 3:
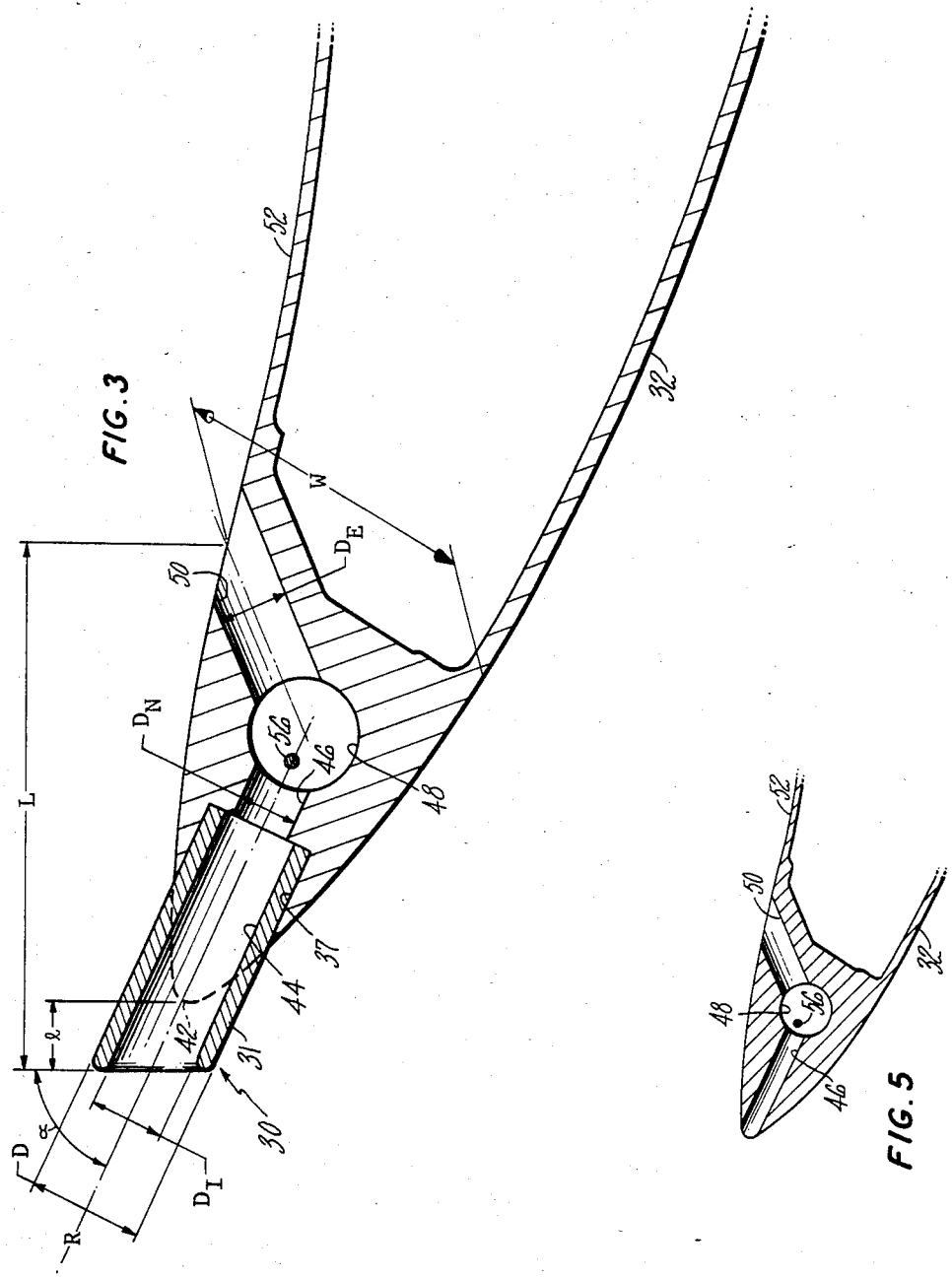
FIG. 3 is a partial sectional view of the strut enlarged to show the details of this invention.

As is more apparent in FIG. 3 the inlet 30 comprises a cylindrically shaped tube 31 mounted in a drilled hole 37 in the leading edge 42 of the strut 32 and the internal passageway 44 communicating with the drilled passage 46 extending from drilled hole 37. Drilled passage 46 communicates with the vertically extending passageway 48 which houses the temperature sensors 56, there being one sensor for each inlet. The drilled passageway 50 on the suction side of strut 32 is judiciously located in a point where the static pressure along the surface 52 is at a low value. By judiciously selecting the inlet to be at the stagnation pressure at the inlet throat of inlet 30 there will always be a given velocity of the engine's working medium to give satisfactory temperature readings throughout the engine's operating envelope.

As mentioned above, the inlet represented by the configuration illustrated in FIG. 5 which is similar to the configuration in FIG. 3 (like reference numerals indicate identical parts) proved to be unsatisfactory. The inlet part of the passageway 46 provides satisfactory temperature readings for above idle but unsatisfactory readings below idle. Another inlet (not shown) constructed with a protruding tube on that leading edge of that strut produced similar unsatisfactory results.

Figure 4:
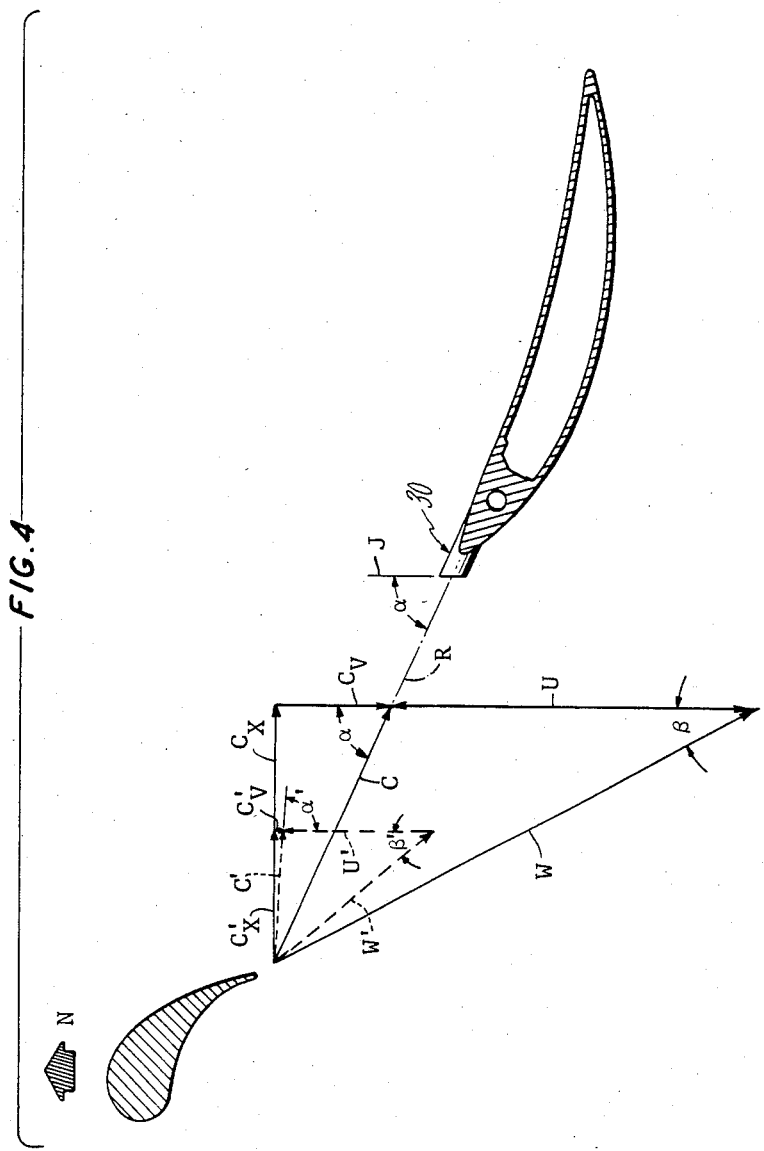
FIG. 4 is a view partially in sections, graphically illustrating vectorily the direction of the engine's working medium relative to the scarfed inlet tube of the probe.

The method of obtaining the proper scarfing can best be seen by referring to FIG. 4. The vector diagram of FIG. 4 illustrates the conditions of the fluid flowing through the turbine bucket for speeds above and below engine idle speeds. The prime symbols represent the speed of the turbine below idle and the unprime symbols represent the turbine speed above idle where the following symbols represent:

N=Rotor speed
Cx=Axial component flow velocity
Cv=Tangential component flow velocity
V=Rotor velocity
W=Relative velocity
C=Absolute flow velocity
$\alpha$=Absolute flow angle
$\beta$=Relative flow angle As noted, the inlet 30 is scarfed in the direction of flow, scarf meaning that the end of tube 31 is truncated relative to the tube's centerline. Obviously, the degree of scarfing and the dimensions of the inlet and outlet are predicated on having the velocity through the probe bear a relationship to the free stream velocity. Hence, the inlet throat should be at the stagnation pressure of the gaseous stream flowing through the strut and the bleed port should be at a station evidencing the desired reduced static pressure.

From the foregoing it is apparent that the absolute flow velocity vector (line C) which for the above idle condition and the centerline R of inlet 30 are oriented in coincidence. Further, the absolute velocity (line C') for conditions below idle is substantially perpendicular to the face of the inlet as indicated by line J.

The dimensions proven to be efficacious for satisfactory temperature signals were based on the following parameters as detailed on FIG. 3.

D=0.40 W
$D_I$=0.70 D
$D_N$=0.75 $D_I$
$(D_E)^2 = (1.5)D_I^2$
l=0.25 W

Where:
$\alpha$ is a function of steady state airflow angle above idle
W is thickness of strut at exit port
L is a function of strut surface static pressure and stagnation pressure at inlet 30 to establish free stream velocity over the temperature measuring element 56.

It should be understood that the invention is not limited to the particular embodiments shown and described herein, but that various changes and modifications may be made without departing from the spirit and scope of this novel concept as defined by the following claims.

We claim:

1. A temperature probe for measuring the temperature of a gaseous stream in rotating machinery whose direction varies, a strut having a leading edge disposed in said gaseous stream, a temperature measuring element mounted in a cavity in said strut and first and second passageways in said strut leading a portion of said gaseous stream from said leading edge to said temperature measuring element and to a discharge port located at the side of said strut where the static pressure is at a value lower than the value of the pressure adjacent said leading edge, means for obtaining a free stream velocity of said gaseous stream in said passageways, said means including a tube projecting from said leading edge communicating with said first passageway, the end of said tube being scarfed and angled relative to the strut in the direction of said gaseous stream.

2. A temperature probe as in claim 1 wherein the angle of the scarfed end of said tube is a function of the direction of flow of said gaseous stream such that the centerline of said tube is oriented in line with said gaseous stream at one pressure level of the gaseous stream and the plane of the inlet face of said tube is perpendicular to the direction of said gaseous stream in a lower pressure level of said gaseous stream.

3. In combination, a turbine having turbine blades being powered by a fluid working medium operating over a range of rotational speeds, a strut mounted in proximity to said turbine disposed in the stream of said fluid working medium discharging from said turbine blades, means for measuring the temperature of said discharging stream including a temperature sensing element mounted in a cavity of said strut, a passageway leading from the leading edge of said strut to a low static pressure station of said strut through said cavity for leading a portion of said discharging stream over said temperature sensing element, a tube having a passage communicating with said passageway and having a central axis mounted in said strut and projecting into said discharging stream, said tube being scarfed and angled relative to the strut in the direction of said discharging stream, the direction of the absolute velocity of said dicharging stream being in coincidence with said central axis at a given predetermined rotational speed of said turbine and the absolute velocity of said discharging stream being perpendicular with a plane in coincidence with the face of the end of said tube projecting in said discharging stream at a reduced speed of said turbine.

* * * * *